(12) United States Patent
Schwarz et al.

(10) Patent No.: US 10,450,476 B2
(45) Date of Patent: Oct. 22, 2019

(54) WRITING, MARKING AND/OR DRAWING LIQUID FOR WRITING IMPLEMENTS, ESPECIALLY FOR CAPILLARY PENS, AND WRITING IMPLEMENT

(71) Applicant: FABER-CASTELL AG, Stein (DE)

(72) Inventors: Wolfgang Schwarz, Ansbach (DE); Gerhard Lugert, Nuremberg (DE); Concetta Goschala, Nuremberg (DE)

(73) Assignee: Faber-Castell AG, Stein (DE)

( * ) Notice: Subject to any disclaimer, the term of this patent is extended or adjusted under 35 U.S.C. 154(b) by 111 days.

(21) Appl. No.: 15/696,227

(22) Filed: Sep. 6, 2017

(65) Prior Publication Data

US 2018/0066156 A1    Mar. 8, 2018

(30) Foreign Application Priority Data

Sep. 8, 2016 (EP) .................................... 16187894

(51) Int. Cl.

| | | |
|---|---|---|
| *C09D 135/02* | (2006.01) | |
| *C09D 7/20* | (2018.01) | |
| *C09D 7/63* | (2018.01) | |
| *B43K 8/02* | (2006.01) | |
| *B43K 8/03* | (2006.01) | |
| *C09D 193/04* | (2006.01) | |
| *C09D 11/00* | (2014.01) | |
| *C09D 11/10* | (2014.01) | |
| *C09D 11/16* | (2014.01) | |

(52) U.S. Cl.
CPC .............. *C09D 135/02* (2013.01); *B43K 8/02* (2013.01); *B43K 8/026* (2013.01); *B43K 8/03* (2013.01); *C09D 7/20* (2018.01); *C09D 7/63* (2018.01); *C09D 11/00* (2013.01); *C09D 11/10* (2013.01); *C09D 11/16* (2013.01); *C09D 193/04* (2013.01)

(58) Field of Classification Search
CPC . C09D 7/20; C09D 7/63; C09D 11/00; C09D 11/10; C09D 11/16; C09D 135/02; C09D 193/04; B43K 8/02; B43K 8/026; B43K 8/03
USPC ........................................................ 523/161
See application file for complete search history.

(56) References Cited

U.S. PATENT DOCUMENTS

| | | |
|---|---|---|
| 4,290,072 A | 9/1981 | Mansukhani |
| 2011/0182651 A1 | 7/2011 | Schwarz et al. |
| 2018/0002554 A1* | 1/2018 | Selmeczy .............. C09D 11/00 |

FOREIGN PATENT DOCUMENTS

JP          2015155517 A      8/2015

* cited by examiner

*Primary Examiner* — Edward J Cain
(74) *Attorney, Agent, or Firm* — Laurence A. Greenberg; Werner H. Stemer; Ralph E. Locher

(57) ABSTRACT

A writing, marking and/or drawing liquid for writing implements, especially for capillary pens, which has a viscosity of less than 50 mPas (Brookfield, 20° C., CPE-40 plate-cone), contains a resin mixture dissolved in a solvent matrix having at least one solvent. Wherein the resin mixture contains a first resin in the form of a modified resin ester and/or a dissolved polyester resin and a second resin in the form of a maleate resin and/or a rosin, especially a phenol-modified rosin. Additives are present in the form of at least one fluorosurfactant as wetter and at least one polyethersiloxane copolymer as glidant.

20 Claims, 1 Drawing Sheet

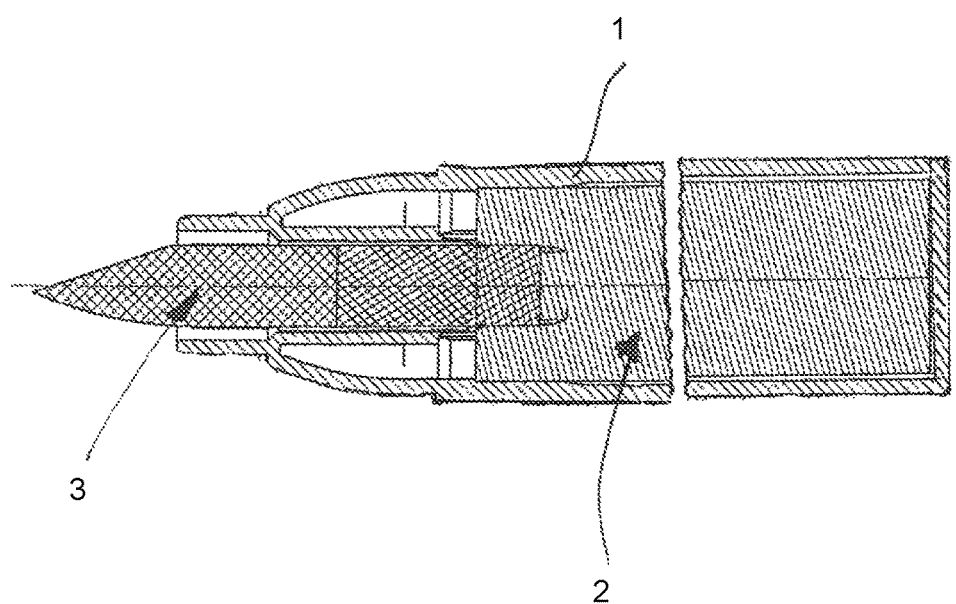

WRITING, MARKING AND/OR DRAWING LIQUID FOR WRITING IMPLEMENTS, ESPECIALLY FOR CAPILLARY PENS, AND WRITING IMPLEMENT

CROSS-REFERENCE TO RELATED APPLICATION

This application claims the benefit, under 35 U.S.C. § 119, of European patent application EP 16187894.7, filed Sep. 8, 2016; the prior application is herewith incorporated by reference in its entirety.

BACKGROUND OF THE INVENTION

Field of the Invention

The invention relates to writing, marking and/or drawing liquid for writing implements, especially for capillary pens, and to a writing implement wherein such writing, marking and/or drawing liquid is used.

Colored marking liquids for so-called markers based on organic solvents such as alcohols, esters, ketones or aromatic solvents such as toluene or xylene have been known for a long time. The colorants used are usually pigments, cationic dyes, so-called oleodyes or metal complex dyes together with one or more wetters and resins. Liquids of this type form films even on smooth surfaces, such as glass or various plastics, and frequently are resistant to splashed water.

Writing implements in which such writing, marking and/or drawing liquids are employed contain a shaft, typically a plastics or metal housing, where onto a closure cap is pushed in the nonuse state. The inside of the shaft accommodates a writing, marking and/or drawing liquid reservoir which is made of a capillary material, for example polyester or polyolefin fibers, and is connected to an applicator element of a likewise capillary material, e.g., a sintered or fiber tip, in fluidic communication, so that the writing, marking and/or drawing liquid may be transported from the reservoir to the tip of the applicator element by virtue of adhesion forces and/or the capillary effect.

Another version of a writing implement utilizes a so-called valve system wherein the writing, marking and/or drawing liquid is filled as a free-flowing liquid into a reservoir within the shaft and liquid delivery takes place via writing or marking tip, preferably made of polyester or acrylic fibers or else of sintered polyolefins. A valve is provided between the tip and the reservoir to control the liquid delivery.

One or more mixing balls are frequently utilized in the liquid with the latter system, especially in the case of pigmented high-viscosity liquids, in order that the liquid may be homogenized by shaking the writing implement before being applied. The utilization of such mixing balls is not possible with capillary systems. The liquids used in capillary systems also have to have very low viscosities of below 50 mPas, but preferably below 20 mPas (Brookfield, 20° C., CPE-40 plate-cone) to ensure adequate application.

Writing implements wherein the writing, marking and/or drawing liquid is bound in a capillary reservoir and contains alcohols, optionally together with ketones and/or esters, however, exhibit the disadvantage, after application and incipient drying on smooth surfaces, for example on glass or plastics, such as polyolefins, that the applied traces are not water fast, but merely fast to splashed water. On immersing the marked glasses, plastics or ceramics in water at room temperature for a period of about 30 minutes or on exposure to a rain test for 30 minutes, the applied lines of this type are substantially removable, in some instances even completely removable. Furthermore, the prior art writing, marking and/or drawing liquids will only achieve some inadequate wetting of the surface on fat-contaminated or oil-contaminated surfaces when applied in writing implements featuring capillary systems. If any wetting is observable at all, the applied line is readily wiped off again. Markings on polyester or polypropylene surfaces from conventional writing, marking and/or drawing liquids will likewise have but a very limited wipe-fastness, meaning that applied lines tend to smudge and thus become illegible. Moreover, after exposure to UV light, the applied lines were merely found to have a low level of light-fastness.

So-called industrial markers contain, for the most part, comparatively high-viscosity colored writing, marking and/or drawing liquids and can only be applied via valve systems, not through conventional capillary systems, owing to the high viscosity (above 50 mPas, 20° C. Brookfield, CPE-40 plate-cone). True, the liquids and/or lines drawn therewith usually display an improved level of wipefastness and moreover in some cases also good water-fastness. Yet writing on plastics surfaces covered with a thin film of fat or oil is only possible to some extent and hence still unsatisfactory. In addition, industrial markers have the disadvantage that they utilize toxicologically concerning aromatic solvents, such as xylene and/or toluene. Applied line lightfastness must further be rated very poor in some cases.

SUMMARY OF THE INVENTION

The problem addressed by the invention is therefore that of proposing, for a writing implement, especially a capillary pen, writing, marking and/or drawing liquid that is improved in respect of the issues and disadvantages described. The problem addressed by the invention is further that of devising a writing implement, especially a capillary pen, wherein said writing, marking and/or drawing liquid is used.

The writing, marking and/or drawing liquid has a viscosity of less than 50 mPas (Brookfield, 20° C., CPE-40 plate-cone) and contains a resin mixture dissolved in a solvent matrix comprising at least one solvent. The resin mixture contains at least a first resin and a second resin, the first resin being a tie resin in the form of a modified resin ester and/or a dissolved polyester resin and the second resin being a hard resin in the form of a maleate resin and/or a rosin, especially a phenol-modified rosin. A hard resin is a resin which is solid at room temperature, while a tie or tackifying resin is particularly notable for its tacky properties and thus acts primarily as a binder. The term resins is used as a collective term for solid to liquid (organic) materials. Hard resin in industry refers to a resin that leads to a hard film of lacquer. With these materials, the melting range is located at about 100° C. or higher. Tie or tackifying resins are room temperature soft, viscid or liquid. The writing, marking and/or drawing liquid further contains additives in the form of at least one fluorosurfactant as wetter and at least one polyethersiloxane copolymer as glidant.

Proceeding from writing, marking and/or drawing liquids utilizing for example mixtures of alcohols as solvent matrix, the inventors carried out comprehensive test series with various resins. The resin mixture of the present invention, combining tie or tackifying resins also known for use in flexographic printing inks with a hard resin, proved to be particularly suitable. The two types of resin are readily miscible and act as binder component and carrier substance for possible further constituents present in the writing, marking and/or drawing liquid. Precisely the combination of a hard resin with a tie resin enables the preparation of low-viscosity liquids having a viscosity below 50 mPas, which are capable of being applied via capillary systems. Lines drawn with the writing, marking and/or drawing liquid, moreover, display a distinctly improved level of rub-fastness over prior art capillary-held marking liquids and good water-fastness. The hard resin therein is mainly responsible for the hardness, the shine and the drying speed of the drawn line or lacquer film, whereas tie or tackifying resins ensure better adherence and flexibility of the lacquer film or of the ink application. Marking liquids will now be predominantly referenced for simplicity.

The first resin or tie resin is present in the subject invention in the form of a modified resin ester and/or a dissolved polyester resin, i.e., a polyester resin solution, and/or the second resin or hard resin is preferably present in the form of a maleate resin and/or rosin, especially phenol-modified rosin. The polyester resin solution used is for example a solution of polyester resins in, for example, ethyl acetate as solvent. Precisely these tie and hard resins gave good to very good adherences not only on smooth surfaces, for example glass, glazed ceramic, polyester sheeting or polyolefin sheeting, but also on surfaces displaying a very thin film of fat or oil. Wipe-fastness and rub-fastness is distinctly improved.

A modified resin ester used particularly as first resin or tie resin has the following properties:
Viscosity (efflux time 80% in
ethyl acetate/20° C.; 4 DIN 53211): 20 to 40 s
Dynamic viscosity 100%/40° C.;
DIN 53214) 4000-8000 mPas
Acid number (DIN ISO EN 2114): ≤20 mg KOH/g
Color number (Gardner Color Standard;
50% in ethyl acetate ASTM D 1544) ≤8
As-supplied form liquid, 80% in ethyl acetate Such a resin is available under the BREMAR 9020[1] tradename for example.

The tie resin likewise used with preference as the first resin is a solution of a polyester resin, having the following properties:
Viscosity at 23° C. (as-supplied form): about 500 mPas
Acid number (DIN ISO EN 2114): about 18 mg KOH/g
Color number Gardner
(as-supplied form): about 1
As-supplied form: liquid, about 60% strength in n-butyl acetate Such a resin is available under the TECO® AddBond 2325[7] tradename for example.

A particularly suitable hard or second resin proved to be a modified maleate resin, i.e., a resin whereto maleic acid is bonded so as to give a resin having an acid number (DIN ISO EN 2114) of 230 to 250 mg KOH/g, having the following characteristics:
Melting point (Kofler hot stage, 6 min): 100±10° C.
Viscosity (efflux time 65% in
ethanol/20° C.; 4 DIN 53211): 20 to 40 s
Acid number (DIN ISO EN 2114): 230 to 250 mg KOH/g
Color number (Gardner Color Standard;
50% in ethanol ASTMD 1544) ≤2
Density (as-supplied form 20° C.) 1.1 g/cm$^3$ Such a resin is available under the ERKAMAR VP 6737[1] tradename for example.

A further resin used as hard or second resin is a phenol-modified rosin, i.e., a resin whereto phenol is bonded, and this in a way such that the resin resulting therefrom has an acid number (DIN ISO EN 2114) of 130 to 150 mg KOH/g and also the following properties:
Melting point (Kofler hot stage,
6 min): 110±10° C.
Viscosity (efflux time 60% in
xylene/20° C.; 4 DIN 53211): 45 to 60 s
Acid number (DIN ISO EN 2114): 130 to 150 mg KOH/g
Color number (Gardner Color Standard;
50% in xylene ASTMD 1544) ≤10
Density (as-supplied form 20° C.) 1.1 g/cm$^3$ Such a resin is available under the BREMAPAL 3005[1] tradename for example.

In order to obtain certain properties for the writing, marking and/or drawing liquid and improve the latter still further, or else in order to improve the mixing of the individual constituents of the marking liquid, to prepare the latter, the writing, marking and/or drawing liquid includes additives. Useful additives include in principle a wide variety of added-substance materials, for example dispersants, antioxidants, photoprotectants or corrosion control agents. According to the invention, the additives present are at least one fluorosurfactant as wetter and at least one polyethersiloxane copolymer as glidant. This firstly serves to augment the solubility of the two resins and their distribution in the solvent matrix. Secondly, the surfactant, here the fluorosurfactant, has a positive effect on the properties of the line drawn with the marking liquid in that this raises the adherence, especially to a surface covered with a film of fat or oil. In addition, uniform lines having a flat and shiny surface can be drawn in this way. The polyethersiloxane copolymer used as glidant provides a distinct enhancement in both film formation, especially as regards the uniformity of the film, and the mar resistance of the film.

The proportion attributable to the resin mixture in the writing, marking and/or drawing liquid can be used to influence the adherence of a drawn line to a substrate, for example to paper or to plastics sheeting. A distinctly improved adherence of lines drawn with the writing, marking and/or drawing liquid will be obtained with a 3 to 30 wt % proportion of the resin mixture, or of all the resin present in the liquid, based on the overall mass of the marking liquid. Limiting the proportion of the tie mixture to not more than 30 wt % ensures that even though very good adherence is attained, the viscosity of the marking liquid does not exceed 50 mPas. This ensures reliable application via capillary systems without any risk of plugging the capillary channels.

In a preferred composition in this connection the first resin is present in a proportion of 1 to 25 wt %, especially 1 to 20 wt %, and/or the second resin is present in a proportion of 2 to 25 wt %, especially 2 to 20 wt %. This percentage is based on the fraction of resin solids in the solvent matrix, or when further constituents are present, in relation to the overall mass of the marking liquid. The choice of ratio between the first and second resins, or between the tie resin and the hard resin, can be used to further improve specifically also the rub- and wipefastness on smooth surfaces, a higher proportion of the second resin, i.e., hard resin, being advantageous. A ratio of first resin to second resin between 1:1 and 1:5, especially between 1:1 and 1:3 will be found to be particularly advantageous. Within these limits, an increased concentration for the hard resin leads to a higher level of film hardness, i.e., a better rub- and wipe-fastness and a higher rate of film drying.

The solvent matrix present is preferably at least one solvent, especially an organic solvent in a proportion of 50 to 80 wt %. Especially the use of an alcohol in combination with a ketone or the use of an alcohol with a ketone and an ester as solvent matrix improves the solubility in the solvent matrix of both resins and furthers their mixing during the preparation of the marking liquid. This in turn also has a positive influence on the adherence and abrasion properties of the writing, marking and/or drawing liquid. Particularly suitable solvents include methyl ethyl ketone and/or 1-methoxy-2-propanol and/or ethanol and/or 1-propanol and/or 2-propanol and/or ethyl acetate in any desired combination. A mixture of methyl ethyl ketone, 1-methoxy-2-propanol and ethanol will prove to be a preferred form of solvent combination. These solvents are unconcerning health wise by comparison with aromatic solvents, such as xylene or toluene.

Preferably, the at least one additive is especially present in a proportion of 0.1 to 8 wt %, especially in a proportion of 0.1 to 5 wt %.

In an advantageous composition, the at least one wetter is present in a proportion of 0.3 to 2.0 wt % and/or the at least one glidant is likewise present in a proportion of 0.3 to 2.0 wt %, which has proved particularly suitable not only for the surfactant, more precisely the fluorosurfactant, used as wetter but also for the polyethersiloxane copolymer used as glidant. This firstly serves to particularly augment the solubility of the two resins and their distribution in the solvent matrix. Secondly, the surfactant, here the fluorosurfactant, has a positive effect on the properties of a line drawn with the marking liquid in that this raises the adherence, especially to a surface covered with a film of fat or oil. In addition, uniform lines having a flat and shiny surface can be drawn in this way.

The polyethersiloxane copolymer used as glidant in a proportion of 0.3 to 2.0 wt % provides a distinct enhancement in both film formation, especially as regards the uniformity of the film, and the mar resistance of the film.

To produce colored writing, marking and/or drawing liquid, at least one colorant is included, especially in a proportion of 5 to 20 wt %, more preferably in a proportion of 8 to 15 wt %. So-called metal complex dyes, e.g., CI Solvent Red 160, CI Solvent Yellow 82, CI Solvent Blue 44, CI Solvent Blue 67, CI Solvent Black 27 have been found to be particularly suitable here. Useful colorants further include pigments, for example carbon black. The colorant becomes efficiently bound in the marking liquid by the resin mixture dissolved in the solvent matrix, thereby distinctly improving the migration behavior of the marking liquid and/or of the colorant, i.e., the penetration thereof into the surface on which the line is drawn. This reduces any fading or vanishing of the drawn line and/or any change in the hue of the drawn line. The drawn lines further exhibit outstanding lightfastness due to the resin mixture used.

Varying the individual described constituents of the writing, marking and/or drawing liquid enables the viscosity thereof to be advantageously lowered to less than 20 mPas, especially to less than 10 mPas (Brookfield, 20° C., CPE-40 plate-cone) in order to enhance the capillary transportability.

The marking liquid is used in a writing implement, especially a capillary pen. The writing implement therefor has a construction having the features set forth in claim 16 and comprises a writing tip made of a capillary material and a reservoir made of a capillary material and containing writing, marking and/or drawing liquid having the properties described above.

Other features which are considered as characteristic for the invention are set forth in the appended claims.

Although the invention is illustrated and described herein as embodied in a writing, marking and/or drawing liquid for writing implements, especially for capillary pens, and writing implement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, longitudinal sectional view of a capillary pen according to the invention.

DETAILED DESCRIPTION OF THE INVENTION

Referring now to the single FIGURE of the drawing in detail, there is shown a writing implement, for example a marker, which is substantially pen-shaped and has a shaft 1 wherein is present a reservoir 2 made of a capillary material or a fiber reservoir of low density, for example a polyester fiber reservoir. The front end of the pen bears a writing tip 3 made of a capillary material or a fiber tip which at its rear end is in communication with the fiber reservoir 2 and/or projects thereinto.

The manufacture of the writing, marking and/or drawing liquid takes place predominantly in mixing tanks in which the solvent is gradually admixed with the resin constituents, i.e., the hard resin and the tie resin, and also with the further components, for example colorants or additives. All the while a stirrer is working homogenizingly in order that the components may be intensively commixed and distributed in a sufficiently uniform manner. During manufacture, moreover, the temperature rises slightly to about 40 to 45° C. Evaporated fractions of solvent are replenished at the end of the homogenizing process. Thereafter, the writing, marking and/or drawing liquid thus obtained is filled into the reservoir 2 of capillary material in the writing implement described above.

Tests were carried out by using the writing implement to draw lines on various surfaces, inter alia on paper, on smooth surfaces such as glass or plastics and also on surfaces contaminated with fat or oil. The drawn line was subsequently assessed against various criteria. Firstly, the color of the line was evaluated as regards its intensity after a delay time of a few seconds, as was the light-fastness of the line following irradiation with UV light. Secondly, wipe tests were carried out in order to analyze the adherence and rub-fastness of the line.

Four example formulations of writing, marking and/or drawing liquids are adduced hereinafter:

EXAMPLE 1

Example formulation for a red marking liquid having a viscosity of 4.0 mPas (Brookfield, 20° C., CPE-40 plate-cone):

| | |
|---|---|
| modified maleate resin[1] | 12.0 wt % |
| modified resin ester 80% in ethyl acetate[1] | 5.0 wt % |
| methyl ethyl ketone | 27.5 wt % |
| 1-methoxy-2-propanol | 23.0 wt % |
| ethanol | 21.0 wt % |
| fluorosurfactant: perfluoroalkyl-substituted polyether, CAS 52550-44-4[6] | 0.5 wt % |
| C.I. Solvent Yellow 82[3] | 1.0 wt % |
| Solvent Red 160[2] | 9.0 wt % |
| polyethersiloxane copolymer[7] | 1.0 wt % |

The resin mixture is very readily soluble in the solvent matrix used in Example 1: a mixture of methyl ethyl ketone, 1-methoxy-2-propanol and ethanol. Lines drawn with a marking liquid according to Example 1 exhibit good water-fastness, especially on glass or ceramic surfaces, by comparison with commercially available alcoholic permanent marker inks, by virtue of the resin ester used as tie resin.

EXAMPLE 2

Example formulation for a blue marking liquid having a viscosity of 4.3 mPas (Brookfield, 20° C., CPE-40 plate-cone):

| | |
|---|---|
| phenol-modified rosin[1] | 14.0 wt % |
| modified resin ester 80% in ethyl acetate[1] | 6.0 wt % |
| methyl ethyl ketone | 25.0 wt % |
| 2-propanol | 22.0 wt % |
| ethanol | 20.0 wt % |
| polyethersiloxane copolymer[7] | 1.8 wt % |
| FC-4430[5] fluorosurfactant | 1.2 wt % |
| C.I. Solvent Blue 44[4] | 10.0 wt % |

Example 2 has the highest proportion of additives, namely 1.2 wt % of fluorosurfactant and 1.8 wt % of polyethersiloxane copolymer. As a result, the drawn line has particularly good adherence, even to oil-containing or fat-containing surfaces. The line further exhibited uniform film formation. A further difference from the marking liquid of Example 1 is that a phenol-modified rosin is used as hard resin, making the marking liquid more universally useful. As a result, the marking liquid exhibits water-fastness and wipe- and rub-fastness on different substrates. It is further possible to also wet still trickier substrates, e.g., slightly greasy polypropylene.

EXAMPLE 3

Example formulation for a green marking liquid having a viscosity of 10.0 mPas (Brookfield, 20° C., CPE-40 plate-cone):

| | |
|---|---|
| modified maleate resin[1] | 8.0 wt % |
| tie resin solution for solvent-containing formulations (polyester resin styrene-free, as-supplied form liquid, solids content about 60 wt % in n-butyl acetate)[7] | 8.0 wt % |
| methyl ethyl ketone | 26.0 wt % |
| 2-propanol | 22.0 wt % |
| ethanol | 20.0 wt % |
| FC-4430[5] fluorosurfactant | 1.0 wt % |
| polyethersiloxane copolymer[7] | 1.0 wt % |
| C.I. Solvent Yellow 82[3] | 6.0 wt % |
| C.I. Solvent Blue 44[4] | 8.0 wt % |

The formulation of Example 3 contains the first and second resins in equal proportions, i.e., in a ratio of 1:1, so overall, compared with the other examples, the marking liquid has a higher viscosity at 10.0 mPas but nonetheless low enough for capillary pens. Furthermore, lines drawn with marking liquids containing tie resin and hard resin in approximately equal concentrations exhibited good water-fastness on glass or ceramic surfaces in particular.

EXAMPLE 4

Example formulation for a black marking liquid having a viscosity of 6.0 mPas (Brookfield, 20° C., CPE-40 plate-cone):

| | |
|---|---|
| phenol-modified rosin[1] | 10.0 wt % |
| modified resin ester 80% in ethyl acetate[1] | 8.0 wt % |
| ethyl acetate | 10.0 wt % |
| methyl ethyl ketone | 20.0 wt % |
| 1-propanol | 20.0 wt % |
| Ethanol | 19.0 wt % |
| TividaFL2500[8] fluorosurfactant | 0.5 wt % |
| polyethersiloxane copolymer[7] | 0.5 wt % |
| Pigment Black 7 (Hostatint-Schwarz A-N 100)[9] | 12.0 wt % |

The colorant referred to here is a carbon black pigment in a solventborne aldehyde resin formulation. The universality is further improved as a result. Adherence, abrasion resistance, water-fastness of a line drawn with a marking liquid of Example 4 on various substrates improve. The use of the carbon black pigment further results in excellent resistance to light.

The reported weight percentages are each based on the total mass of the writing, marking and/or drawing liquid.

Product Designations/Manufacturers:
1) Robert Kraemer GmbH & Co. KG, 26180 Rastede, Germany
2) Reinhard Neuscheler Handelsvertretungen CDH, 72766 Reutlingen, Germany
3) Ming-Zu Europe GmbH, D-79576 Weil am Rhein, Germany
4) Clariant Iberica Produccion, S.A., 08970 Sant Joan Despi, Spain
5) 3M Osterreich GmbH, 2380 Perchtoldsdorf, Austria
6) Sintal Chemie GmbH, 22605 Hamburg, Germany
7) Evonik Resource Efficiency GmbH, 45127 Essen, Germany
8) Merck KgaA, 64271 Darmstadt, Germany
9) Clariant AG, D-65929 Frankfurt am Main)

The invention claimed is:
1. A writing, marking and/or drawing liquid for writing implements, comprising:
a viscosity of less than 50 mPas (Brookfield, 20° C., CPE-40 plate-cone); and
a resin mixture dissolved in a solvent matrix having at least one solvent, said resin mixture having a first resin in a form of a modified resin ester and/or a dissolved polyester resin, said modified resin ester having properties of:
viscosity efflux time 80% in ethyl acetate at 20 C of between 20 to 40 s;
dynamic viscosity 100% at 40 C.;
rotational viscosity according to DIN 53214 4000-8000 mPas;
acid number being less than or equal to 20 mg KOH/g;

color number tested by Gardner Color Standard 50% in ethyl acetate ASTM D 1544 being less than or equal to 8;

said modified resin ester being liquid 80% in ethyl acetate;

and a second resin in a form of a maleate resin and/or a rosin, and additives in a form of at least one fluorosurfactant as wetter and at least one polyethersiloxane copolymer as glidant.

2. The writing, marking and/or drawing liquid according to claim 1, wherein said resin mixture is present from 3 to 30 wt %.

3. The writing, marking and/or drawing liquid according to claim 1, wherein said first resin is in a proportion of 1 to 25 wt % and/or the second resin is in a proportion of 2 to 25 wt %.

4. The writing, marking and/or drawing liquid according to claim 1, wherein a ratio of said first resin to said second resin is between 1:1 and 1:5.

5. The writing, marking and/or drawing liquid according to claim 1, wherein said solvent matrix is present in a form of 50 to 80 wt % of said at least one solvent.

6. The writing, marking and/or drawing liquid according to claim 1, wherein said solvent matrix includes an alcohol and a ketone or an alcohol, a ketone and an ester.

7. The writing, marking and/or drawing liquid according to claim 1, wherein said at least one solvent is selected from the group consisting of methyl ethyl ketone, 1-methoxy-2-propanol, ethanol, 1-propanol, 2-propanol, ethyl acetate and any combination of these solvents.

8. The writing, marking and/or drawing liquid according to claim 1, wherein said additives are present in a proportion of 0.1 to 8 wt %.

9. The writing, marking and/or drawing liquid according to claim 1, wherein:

said wetter is present in a proportion of 0.3 to 2.0 wt %; and/or said at least one glidant is present in a proportion of 0.3 to 2.0 wt %.

10. The writing, marking and/or drawing liquid according to claim 1, further comprising at least one colorant in a proportion of 5 to 20 wt %.

11. The writing, marking and/or drawing liquid according to claim 10, wherein said colorant is a dye.

12. The writing, marking and/or drawing liquid according to claim 1, wherein said viscosity is less than 20 mPas (Brookfield, 20° C., CPE-40 plate-cone).

13. The writing, marking and/or drawing liquid according to claim 1, wherein said first resin is present in a proportion of 1 to 20 wt % and/or said second resin is present in a proportion of 2 to 20 wt %.

14. The writing, marking and/or drawing liquid according to claim 1, wherein a ratio of said first resin to said second resin is between 1:1 and 1:3.

15. The writing, marking and/or drawing liquid according to claim 1, wherein said at least one solvent is an organic solvent.

16. The writing, marking and/or drawing liquid according to claim 1, wherein said rosin is phenol-modified rosin.

17. The writing, marking and/or drawing liquid according to claim 1, wherein said additives are present in a proportion of 0.1 to 5 wt %.

18. The writing, marking and/or drawing liquid according to claim 10, wherein said dye is a metal complex dye and/or a color pigment.

19. The writing, marking and/or drawing liquid according to claim 1, wherein said viscosity is less than 10 mPas (Brookfield, 20° C., CPE-40 plate-cone).

20. A writing implement, comprising:

a writing tip made of a capillary material; and a reservoir made of a further capillary material and containing a writing, marking and/or drawing liquid, said writing, marking and/or drawing liquid having:

a viscosity of less than 50 mPas (Brookfield, 20° C., CPE-40 plate-cone); and a resin mixture dissolved in a solvent matrix having at least one solvent, said resin mixture having a first resin in a form of a modified resin ester and/or a dissolved polyester resin, said modified resin ester having properties of:

viscosity efflux time 80% in ethyl acetate at 20 C of between 20 to 40 s;

dynamic viscosity 100% at 40 C.;

rotational viscosity according to DIN 53214 4000-8000 mPas;

Acid number being less than or equal to 20 mg KOH/g;

color number tested by Gardner Color Standard 50% in ethyl acetate ASTM D 1544 being less than or equal to 8;

said modified resin ester being liquid 80% in ethyl acetate;

and a second resin in a form of a maleate resin and/or a rosin, and additives are present in a form of at least one fluorosurfactant as wetter and at least one polyethersiloxane copolymer as glidant.

* * * * *